Patented Apr. 21, 1931

1,802,008

UNITED STATES PATENT OFFICE

DOZIER FINLEY, OF BERKELEY, CALIFORNIA, ASSIGNOR TO THE PARAFFINE COMPANIES, INC., OF SAN FRANCISCO, CALIFORNIA, A CORPORATION OF DELAWARE

CONSTRUCTIONAL MATERIAL AND METHOD OF MAKING THE SAME

No Drawing.     Application filed July 26, 1926.     Serial No. 125,129.

My invention relates to a construction material and particularly to surfacing granules for use on prepared roofing, or on concrete or plaster bases.

One of the objects of my invention is the production of artificially colored surfacing granules which will retain their color indefinitely even though exposed to the elements.

Another object of the invention is the production of surfacing granules having a more uniform and a wider range of color than has heretofore been obtainable.

My invention possesses other objects and features of advantage some of which with the foregoing, will be set forth in the following description of my invention. It is to be understood that I do not limit myself to the showing made by the said description, as I may adopt variant forms of my invention within the scope of the claims.

In terms of broad inclusion my invention comprises heating properly prepared granules with a coloring matter and a binder and vehicle to bring about an even distribution of the coloring matter and to permanently fix it on the granules, so that prolonged exposure to the elements will not change the color. Many efforts have been made to color granules of mineral matter for surfacing purposes, but so far as I am aware none of these methods have become commercially successful. Stone and brick of suitable coloring have been crushed and used for this purpose, but the waste occasioned by the crushing and the unevenness of the coloring have prevented this method from being satisfactory. Various methods of coloring granules have been dropped as commercial possibilities because of chemical reactions between the ingredients used to bind and fix the color, and some ingredient in the surface to which the granules have been applied. Such reactions loosen granules so that they drop off the surface. Another objection to the coloring processes heretofore suggested is the impossibility of securing a uniform and permanent color. It might appear that it would be simple to produce by fusion low grade slags, enamels, glasses or tile, of almost any desired color and to crush these products with the consequent production of granules of the desired color. When it is considered, however, that in the crushing operation approximately 50 per cent of the material must be rejected as fines and either thrown away or reprocessed, it becomes apparent that a more or less costly color would be wastefully employed if it were distributed uniformly throughout the mass of the granules as would be the case if granules were produced by the crushing of specially made slags and grasses. By the use of my method only properly sized granules are used which reduces the costs materially, and the color produced is uniform and permanent.

In detail my invention comprises a process of treating granules to impart a permanent color, and comprises the following steps. A suitable rock is selected, preferably one which will produce a fairly hard granule. Whenever possible it is desirable to use a rock having a natural color similar to the color it is desired to produce in the finished product. When rock possessing a natural color is not available, a gray or other light colored granule may be utilized with satisfactory results. This rock is then crushed and screened, the size best suited for this work being that which will pass through a 10-mesh and be retained on a 24-mesh screen. Of course, a certain amount of variation in the size of the granules is permissible, as the size required for one purpose might be unsuited for another purpose.

It will be found that when natural rocks are crushed they normally break with a rough fracture and present projecting and recessed portions over their surfaces which enabled an applied coating to adhere thereto. In other words a stone surface having a rough texture is possessed of a quality frequently designated as "tooth" which is always conducive to a firm and permanent bedding of a normally adhesive coating.

To this crushed rock a binder, preferably sulfur, and the desired coloring matter are added. A sulfur and heat resistant coloring matter, such as chromium oxide for green, and iron oxide for red, should be used to obtain satisfactory and permanent results. It will be found necessary, as in all other arts where colors are used, to mix various pigments to secure the desired colors in the finished product. For example zinc oxide may be used to lighten one color, or ultramarine blue may be added to counteract the yellow color of the surfur.

The granules, binder and coloring matter are thoroughly mixed together in dry form by the use of a suitable apparatus, such as a concrete mixer, or by shoveling over and over on a platform. When this step has been completed the mixture is introduced into a furnace where it is simultaneously heated and agitated. Due to the facility in feeding and discharging, and the uniform and thorough agitation possible, I prefer to use the well known outside fired rotary kiln type of furnace, but other kinds of furnaces may be used.

The mixture is heated to a temperature preferably ranging between 115° C. and 175° C., and the heating and agitation continued until every particle is brought up to temperature and thoroughly coated. Sulfur melts at about 114° C., forming a thin straw colored liquid which takes up and carries the coloring matter, spreading it over the entire surface of the granules. It will thus be apparent that the sulfur has a plurality of functions in this process. It serves to carry the coloring matter and spread it evenly over the surface of the granules; it fixes the color and resists the action of the elements. It has the function of a binder, a carrier, a preservative and a fixative, but in the specification and claims I have used only the term "Binder" but in so doing it is understood that I do not exclude the other functions just enumerated. As the temperature increases, the viscosity of the sulfur increases so that a pasty or dough-like coating of sulfur and coloring matter surrounds each granule, adhering to the uneven surfaces. At temperatures above 175° C. the sulfur is apt to ignite and produce the disagreeable sulfur dioxide fumes. In order to prevent this an inert gas such as carbon dioxide, or nitrogen may be passed over the material during the heating process; or if preferred steam may be injected to blanket the heated mass, the temperature of which is above the condensation point of steam so that the presence of the steam will not wet the product. Another reason for preferably keeping the temperature below 175° C. is to maintain the granular state of the product at all times thus insuring an uniform color. At higher temperatures, due to the increased viscosity of the sulfur, the material has a tendency to cling together in a somewhat plastic granular mass.

To produce a green colored product from rock having a grey color the following ingredients in the proportions stated will be found to produce a satisfactory result: 2000 pounds granules, 16 pounds chromium oxide, 4 pounds ultramarine blue, 30 pounds powdered sulfur.

These ingredients should be mixed and heated in the manner just described and the finished product sacked or otherwise stored until ready for use.

Pigments other than chromium oxide may be used. The use of ultramarine blue with chromium oxide is above suggested in order to counteract the yellowing effect of the sulfur. Ultramarine may be used alone with the sulphur in which case about 24 pounds of ultramarine and 40 pounds of sulphur to one ton of granules will be found to give a satisfactory coloring. Zinc oxide may be used to the amount of 10 pounds or so to lighten the color of the above or any other pigment. Iron oxide to the amount of 15 or 20 pounds per ton will give a reddish color according to the character of the iron oxide used. Ochre may be used but at the temperature employed will tend to develop into a sienna. It will be appreciated that combinations of the above colors may be used to effect any desired result.

I claim:

1. The process of coloring mineral granules which comprises mixing in dry form the granules together with sulfur and inorganic coloring matter, and heating the resultant mixture while agitating it to liquefy the sulfur and to provide a coating of the coloring matter and sulfur on the granules.

2. The process of coloring mineral granules which comprises mixing in dry form the granules together with sulfur and inorganic coloring matter, and heating the resultant mixture at a temperature below 175° C. while agitating it to liquefy the sulfur and to provide a coating of the coloring matter and sulfur on the granules.

In testimony whereof, I have hereunto set my hand.

DOZIER FINLEY.